Sept. 16, 1958
C. J. SMITH
2,852,151
WHEEL DOLLY
Filed Jan. 30, 1956
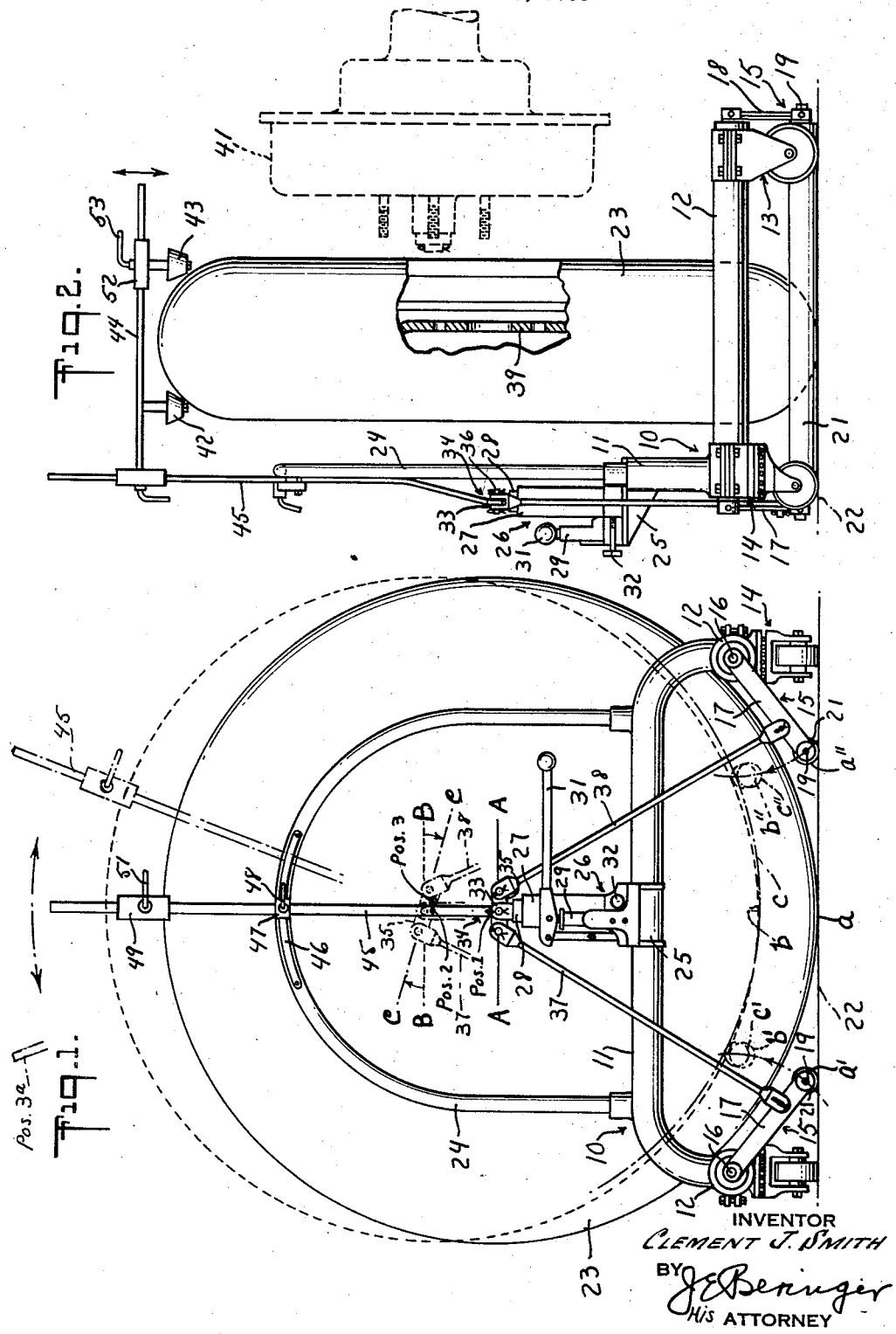
INVENTOR
CLEMENT J. SMITH
BY
J. E. Beringer
His ATTORNEY

2,852,151

WHEEL DOLLY

Clement J. Smith, Vandalia, Ohio

Application January 30, 1956, Serial No. 562,058

5 Claims. (Cl. 214—332)

This invention relates to dollies useful in the mounting, demounting and the moving about of wheels and tires of large size, as used on trucks and on aircraft.

An object of the invention is to provide in a device of the class described a self-contained power means whereby a heavy tire or tire and wheel assembly can be raised and lowered by means other than manual.

Another object of the invention is to provide for a vertical lift action to insure that the wheel hub will remain in a position normal to the axle.

A further object of the invention is to provide for plural adjustment of the load carried by the dolly in both vertical and horizontal senses whereby to permit a more facile alignment of the wheel hub with the axle.

A still further object of the invention is to provide a dolly of the class described which is light in weight and simple of construction and mounted on wheels for easy and convenient manipulation by one person.

Other objects and structural details of the invention will appear from the following description when read in connection with the accompanying drawing, wherein:

Fig. 1 is a view in rear elevation, showing in dotted lines alternate positions of adjustment of the lift mechanism, in conjunction with a wheel indicated as received in or carried by the dolly; and Fig. 2 is a view in side elevation of the dolly, showing in dotted lines one end of an axle mount for the wheel.

Referring to the drawings, a dolly in accordance with the illustrated embodiment of the invention comprises a rigid frame member, made of tubular steel stock, cast aluminum or the like. The frame comprises a transverse cross bar 11 and forwardly projecting laterally spaced apart tines 12. At one end of each tine 12 is a wheel assembly 13 and at the other end is a caster assembly 14. In the illustrated instance, the wheel assemblies are located at what may be considered to be the front of the dolly since they are at the outer projecting ends of the tines. This relationship between the wheels and casters, and the selective use thereof, may of course be varied. It is the purpose of the wheeled mounting to hold the frame member 10 in a relatively elevated position and to provide for easy manipulation and rolling movement thereof.

Each tine 12 provides a pivotal mounting for a lift assembly 15, the two lift assemblies extending into the area between the tines in a substantially mating, complementary relation. Since the lift assemblies are identical, a description of one will suffice for both. Thus, each assembly comprises a rod 16 rotatably mounted in a respective tine 12 and projecting at its opposite ends through the ends of the tine. Secured to such opposite ends are arms 17 and 18 which have their own ends attached to the rod 16 and have their opposite ends similarly attached to an interconnecting rod 19. On the rod 19 is an anti-friction roller 21. The major axis of the lift assembly is offset with respect to its supporting tine and accordingly tends to drop by gravity beneath the plane of the tines 12, with the anti-friction rollers 21 resting on the same surface 22 on which the wheel and caster assemblies rest. The surface 22 will normally, of course, be a garage, runway or hangar floor. The length of the arms 17 and 18 is such as to space the anti-friction rollers 21 a sufficient distance from each other as to permit them to pass easily beneath a tire at rest on the surface 22. Thus, assuming a tire 23 to be standing in a generally upright position on the surface 22, the dolly is so constructed and arranged that it may be advanced upon the tire in a manner to permit the tines 12 to pass in embracing substantially underlying relation to the tire while the lift assemblies are similarly carried beneath the tire to positions of cooperative relation therewith, the rollers 21 being spaced substantially equal distances from the point of principal contact of the tire with the surface 22. It will be understood that a rocking of the lift assemblies in an upward or counterclockwise direction, as viewed in Fig. 1, will result in their contacting the tire 23 and continued rocking motion of the lift assemblies will raise the tire in a vertical sense off and above the surface 22.

A curved rod 24 has its ends anchored in the cross bar 11 and extends a substantial distance vertically upward from the cross bar in order that it may serve as a handle or hand grip portion whereby the operator may move the dolly about on its wheels 13 and casters 14. Also mounted on the cross bar 11, and intermediate the ends thereof, is a bracket 25 providing a mounting for a conventional hydraulic jack 26. The latter includes, as is customary in such devices, a work cylinder 27 from which projects a fluid pressure actuated piston 28, and a pumping cylinder 29 in which is a pumping piston (not shown) attached to a hand operated lever 31 pivotally connected to the frame of the jack. Manually effected, oscillatory strokes of the lever 31 result in the application of hydraulic pressure within the cylinder 27 to the piston 28 and hence in extension of the piston from the work cylinder. A screw device 32 is manipulative to release the hydraulic pressure in the work cylinder 27 to permit the piston 28 to retract within the cylinder. The hydraulic jack 26 is so mounted on the cross bar 11 as to cause the piston 28 to be extended in a vertical sense or in a direction normal to the plane of the surface 22.

On the outer projecting end of the piston 28 is a U-shaped bracket 33 receiving a bell crank lever 34. The lever 34 comprises a relatively short arm 35 which is pivotally connected at its mid point to the bracket 33 by a pin 36. At the opposite ends of the arm 35 are pivotally connected the one end of links 37 and 38, pivotally connected at their opposite ends to corresponding arms 17 of respective lift assemblies 15. According to the construction and arrangement of parts, it will be apparent, an extending or elevating movement of the hydraulically actuated piston 28 serves to raise the lift assemblies 15. Similarly, retraction or withdrawal of the piston lowers the lift assemblies. In the operation of the device, therefore, the dolly may be advanced upon a tire, as before described, and the hand lever 31 actuated to lift the tire from the floor. The dolly then may be pushed or pulled as desired to bring the tire to the truck or aircraft upon which it is to be mounted and the hydraulic means is then again actuated to align the wheel plate 39 (Fig. 2) with the mounting portions of the axle end 41. Finally, the dolly is pushed forwardly, placing the tire and wheel in an installed position on the axle and then is withdrawn while the tire assembly remains. As will be understood, a similar sequence of operations is followed in removing a tire or tire and wheel assembly.

While a tire may be held by hand in an upright position upon the dolly, in the illustrated embodiment of the invention vertical alignment gauges 42 and 43 are provided, engageable with the upper surface of the tire.

The gauges 42 and 43 are mounted on a forwardly projecting rod 44 extending from an upright elongated arm 45 forming a further part of the bell crank lever 34. The lever 45 extends upward from the hydraulically actuated piston 28 and in addition to providing a mounting for the rod 44 also provides a manual means for rocking the arm 35 about the pivot pin 36 whereby to raise and to lower the lift assemblies independently of the hydraulic jack 26. It further will be apparent that a rocking motion of the arm 35, as described, will result in a raising of one of the lift assemblies 15 and in a corresponding lowering of the other lift assembly whereby to produce in a supported tire or tire and wheel assembly a lateral shifting motion. Thus, in bringing a wheel to a position of alignment with portions of the axle end 41, if a lateral adjustment of the wheel is indicated this can be achieved through manipulation of the arm 45 and without the need for bodily shifting the entire dolly device.

The arm 45 extends upward between the hand grip 24 and a strip 46 mounted thereon. The arm 45 is connected to the strip 46 through a sleeve 47 and adjustment screw 48, which latter elements define a releasable locking device whereby the arm 45 may be selectively held in a set position of adjustment. The rod 44 also is connected to the arm 45 for vertical adjustment thereon through a sleeve 49 and an adjustment screw 41. Also, the gauge 43 on the rod 44 is adjustable therealong by virtue of its connection with the rod afforded by a sleeve 52 and a screw member 53.

In the latter regard, it will be recognized that the device of the illustrated embodiment of the invention is adapted for the handling of double wheels as used in some truck installations. The device can, of course, be made shorter in length and might also be made longer and as such be useful in the moving about of a plurality of aligned tires.

In Fig. 1 of the drawing, three different positions of the lift assemblies, and of the wheel carried thereby, have been shown. Position No. 1 is shown in full lines, with the wheel at rest on the surface 22 but with the sides thereof in contact or substantially in contact with the tines 12. It is in this position of the parts that the upper rod 44 is lowered to align the wheel vertically through the gauges 42 and 43. Position No. 2 is shown in dotted lines, and, as indicated, in this position of the parts the wheel is fully raised. Position No. 3 is indicated in dot-dash lines and illustrates the parts as they appear with the arm 45 adjusted fully or substantially fully to the right, this action having the effect of shifting the wheel laterally to the right, or off center with respect to its No. 2 position.

Centers for the above described positions are shown and appropriately marked. Also, the several positions assumed by the arm 34 are shown and indicated at AA, BB and CC. The peripheral outline of the wheels is indicated in the several positions at a, b and c. Still further, the supporting rollers 21 of the left hand lift assembly (as viewed in Fig. 1) are indicated at a', b' and c' while the positions of the corresponding roller of the right hand lift assembly are indicated at a", b" and c".

The parts may also assume a still further position wherein the lever 45 is adjusted fully to the left. In this position, the left hand lift assembly would be lowered while the right hand assembly was raised and the result would be to shift the wheel off center to the left. A part of the arm 45 in this position is illustrated and marked for convenience (position No. 3a). Further, the hydraulic jack mechanism and the arm 45 are movable substantially infinitely within the extremes defined by the positions of adjustment described.

What is claimed is:
1. A wheel dolly, including a rigid frame presenting a cross member and forwardly projecting spaced apart tines, wheels mounting said frame and holding it relatively elevated, a pair of lift assemblies supported between said tines for relative pivotal movement and being laterally spaced apart, said assemblies tending by their own weight to drop beneath the plane of said tines, power means mounted on said cross bar and including a vertically reciprocable piston, a horizontally disposed lever pivotally connected at about its mid point to said piston to be carried thereby and tiltable relatively thereto, links connecting the opposite ends of said lever to respective lift assemblies whereby reciprocation of said piston effects unison raising and lowering of said lift assemblies, and a handle attached to said lever to tilt said lever independently of said piston whereby one of said lift assemblies is raised while the other one correspondingly is lowered.

2. A wheel dolly according to claim 1, characterized by releasable means tending normally to hold said handle from movement to tilt said lever.

3. A wheel dolly according to claim 1, wherein said handle stands generally upright in a position between said lift assemblies, characterized by anti-friction wheel engaging means slidably adjustable on said handle and extending forwardly between said lift assemblies in position to overlie a wheel supported thereon.

4. A wheel dolly, including a rigid frame presenting a cross bar and a pair of forwardly projecting spaced apart tines, wheels mounting said frame, pivotal lift assemblies, one mounted on each of said tines for relative swinging motion and extending into the area between said tines, hydraulic means including a pressure fluid extensible piston on said cross bar, connections between said piston and said lift assemblies, including a lever connected at its mid-point to said piston and at its ends to respective lift assemblies, a rocking motion of said lever about said piston serving to raise one lift assembly while lowering the other, manipulative means controlling the extending and retracting movements of said piston, and other manipulative means for rocking said lever.

5. A wheel dolly, including a rigid frame presenting a cross bar and a pair of forwardly projecting spaced apart tines, wheels mounting said frame, pivotal lift assemblies, one mounted on each of said tines for relative swinging motion and extending into the area between said tines, power means including a vertically reciprocable piston supported by said cross bar, a generally horizontally disposed lever pivotally connected at a point intermediate its ends to said piston, links extending from said lever on respectively opposite sides of said point to said lift assemblies simultaneously to raise and to lower said lift assemblies in response to extending and retracting motions of said piston, rocking movements of said lever about said piston serving to raise one lift assembly while simultaneously and correspondingly to lower the other, manipulative means controlling the extending and retracting movements of said piston, and other manipulative means for rocking said lever.

References Cited in the file of this patent
UNITED STATES PATENTS

| 2,170,607 | Green | Aug. 22, 1939 |
| 2,386,516 | Thompson | Oct. 9, 1945 |
| 2,468,884 | L'Esperance et al. | May 3, 1949 |
| 2,476,493 | Johnson | July 19, 1949 |
| 2,725,998 | Huff | Dec. 6, 1955 |